Patented Mar. 29, 1927.

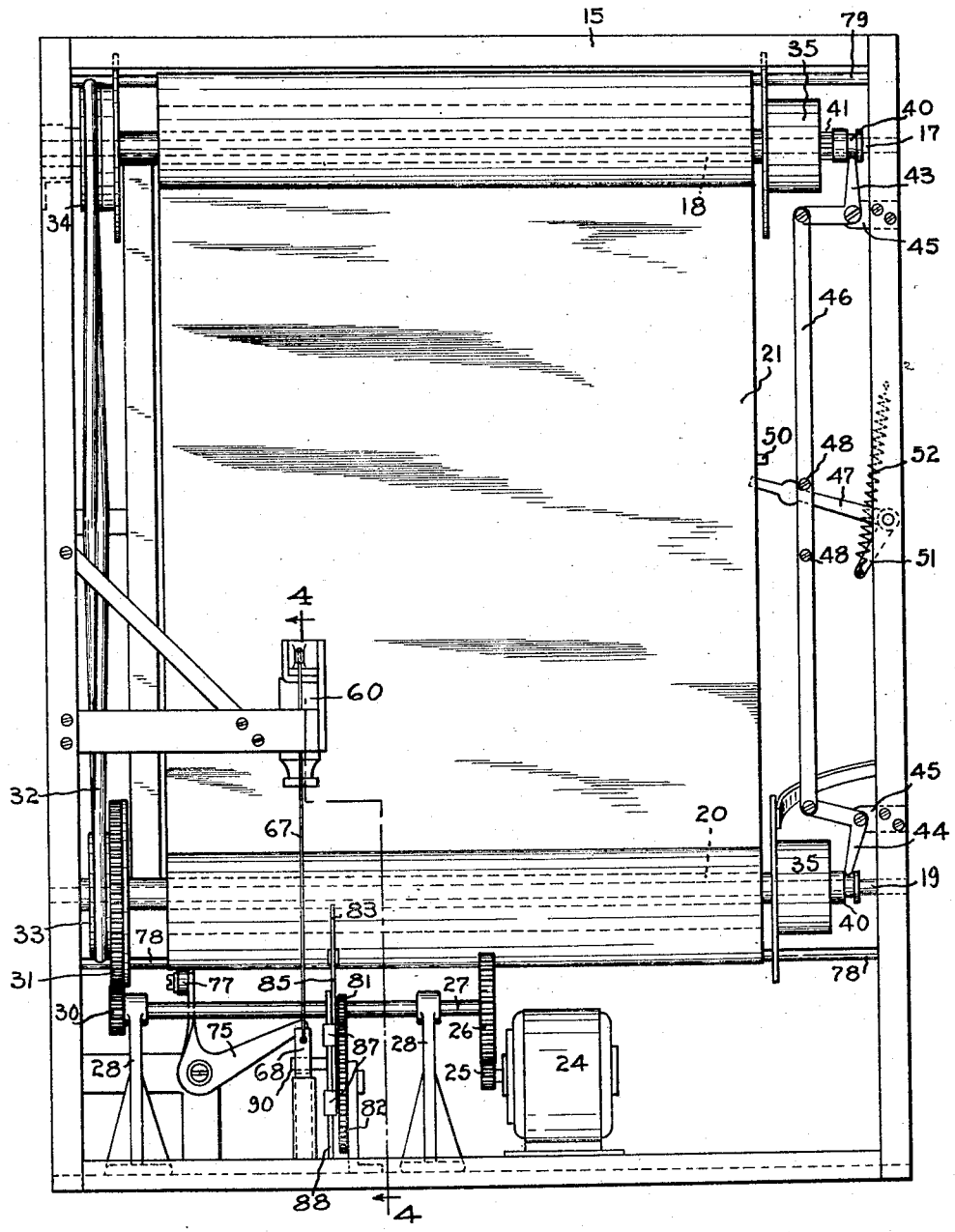

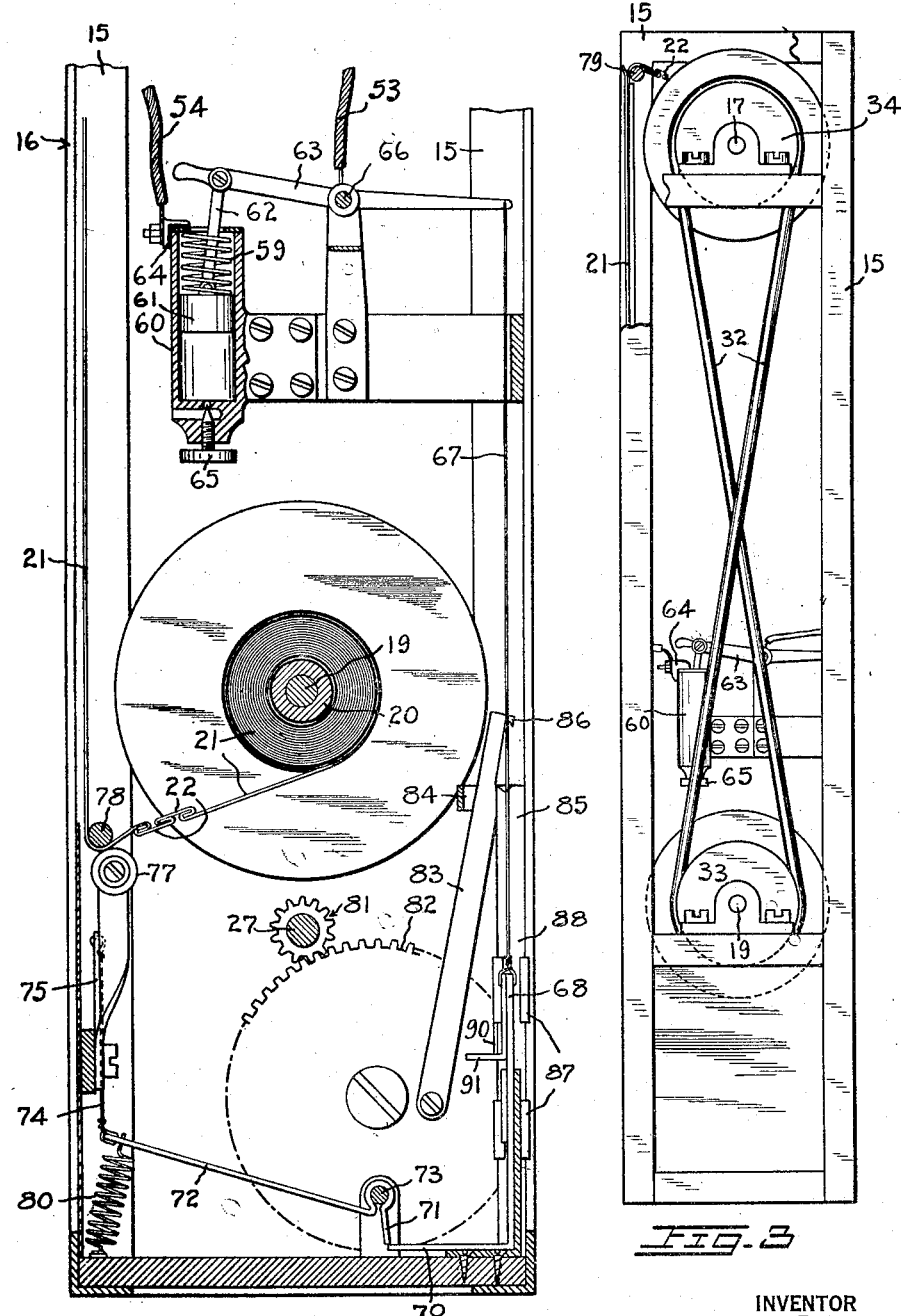

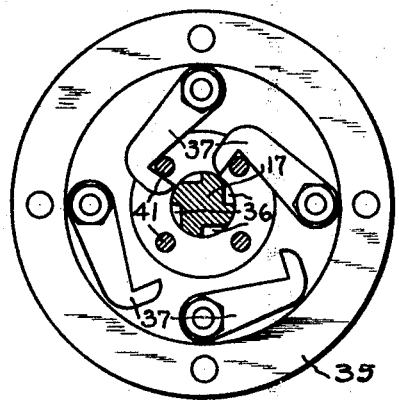
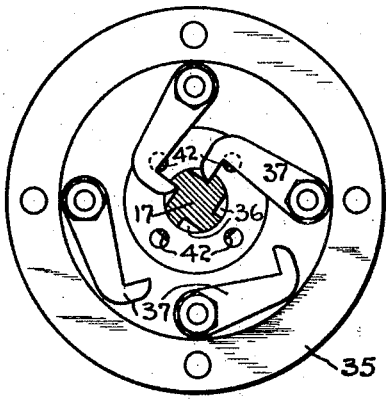
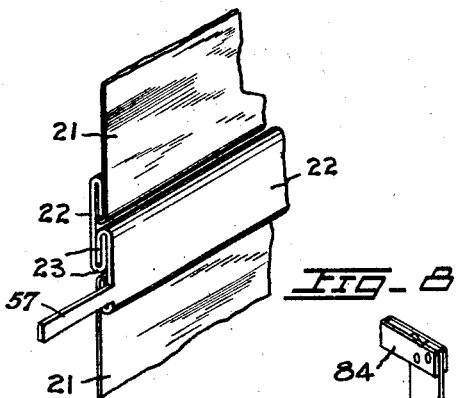
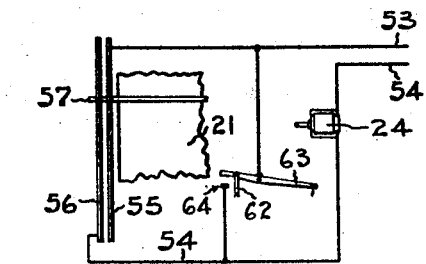
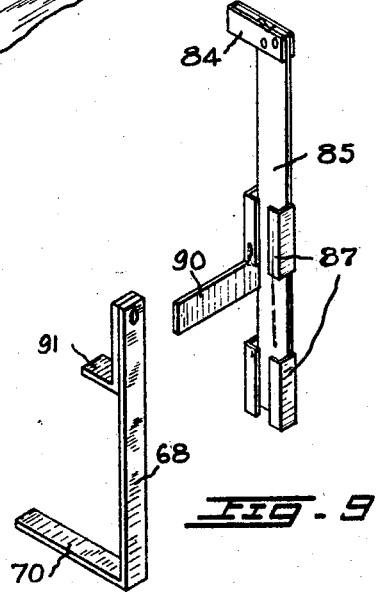
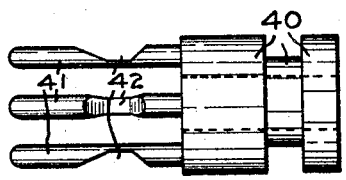

1,622,410

UNITED STATES PATENT OFFICE.

FRANK W. BLUMIE, OF SEATTLE, WASHINGTON, ASSIGNOR TO AUTOMATIC DISPLAY COMPANY, OF SEATTLE, WASHINGTON, A CORPORATION OF WASHINGTON.

ADVERTISING DISPLAY DEVICE.

Application filed March 31, 1925. Serial No. 19,599.

My invention relates to improvements in machines for displaying advertising matter and the object of my invention is to provide a machine of strong and simple construction that will automatically display successive advertisements on a curtain, said machine starting and stopping alternately to bring successive sections of a curtain into view and display said sections for a predetermined period of time before the next successive section is brought into view.

Another object is to provide a machine of this nature that is reliable and efficient in the construction, that is fully automatic in its operation, that will run for long periods of time without attention and that will automatically reverse itself and rewind a curtain after it has been wound to the end in one direction.

Another object is to provide efficient automatic devices for regulating the period of time during which an advertisement will be displayed.

Other objects are to provide simple and efficient driving mechanism and clutch and reversing mechanism for operating this machine, said driving and clutch mechanism being arranged so that the machine will operate smoothly and evenly without making any appreciable noise and without straining the mechanism or producing abrupt starting and stopping of the moving parts.

Other and more specific objects will be apparent from the following description taken in connection with the accompanying drawings, wherein—

Fig. 2 is a view in rear elevation of the same;

Fig. 3 is a view in side elevation with parts broken away of the same;

Fig. 4 is a fragmentary sectional view on a larger scale of the same substantially on broken line 4, 4 of Fig. 2;

Figs. 5 and 6 are enlarged views partly in section and partly in elevation illustrating the operation of certain clutch mechanism embodied in my invention;

Fig. 7 is a view in elevation of a detail of the clutch mechanism embodied in my invention;

Fig. 8 is a fragmentary isometric detail illustrating the manner of fastening two successive sections of an advertising display curtain together;

Fig. 9 is an isometric view showing two parts of certain trip and reset mechanism as said parts may appear when detached from the machine; and Fig. 10 is a wiring diagram illustrating the motor and driving connections.

Figure 1:
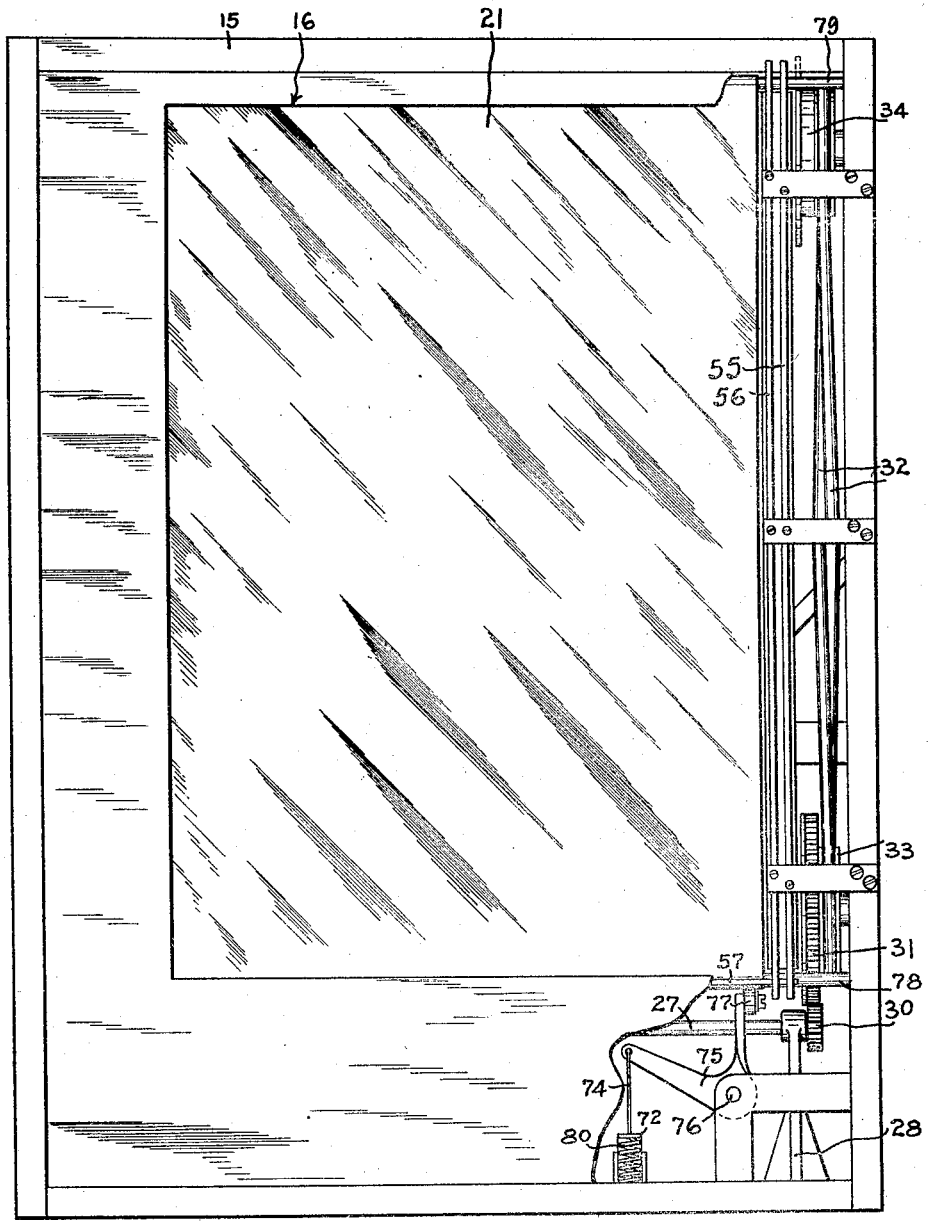
Figure 1 is a view in front elevation with parts broken away of an advertising display machine constructed in accordance with my invention.

Referring to the drawings throughout which like reference numerals designate like parts, 15 designates a rectangular frame having on its front side a rectangular display opening 16 through which a curtain may be seen, said frame being arranged to rest on its base portion or to be secured to a wall or support in any convenient manner in a conspicuous location.

The frame 15 is provided near its upper end with a transverse shaft 17 whereon an upper roller 18 may be rotatably mounted and said frame is provided near its lower end with another transverse shaft 19 whereon a lower roller 20 may be rotatably mounted.

A curtain made up of a plurality of sections 21 detachably connected together, and each large enough to cover the entire curtain display opening 16 and to have a complete advertisement display thereon is secured to rollers 18 and 20. For the purpose of connecting the ends of the several curtain sections 21 together, I have provided on each end of each curtain section a long clip 22, that is secured to the end of the curtain section and extends entirely across the same and that is provided with a hook shaped portion 23 arranged to be engaged by a corresponding hook shaped portion on the edge of the next adjacent curtain as more clearly shown in Fig. 8. These detachable sheet metal connections between the ends of successive curtain sections perform a double function, namely that of connecting the curtain sections together and that of actuating certain trip mechanism as hereinafter explained.

The shafts 17 and 19 are driven continuously by a motor 24 having a pinion 25 that meshes with a gear wheel 26 on a shaft 27 that is journaled in bearing brackets 28 and is provided with a pinion 30 that meshes with a gear wheel 31 on the lower roller shaft 19. An endless belt 32 passing over drums 33 and 34 on shafts 19 and 17 respectively, serves to drive the top shaft 17 at the same rate of speed as the shaft 19, and in a reverse direction.

Although shafts 17 and 19 are both driven continuously in opposite directions when the motor is running only one of the rollers 18 or 20 at a time is connected with its respective shaft so that the roller that the curtain is winding onto is always a driven roller and the roller that the curtain is unwinding from is always free.

This is accomplished by means of suitable clutches provided in drums 35 at the right hand end of rollers 18 and 20 as seen in Fig. 2. Any desired type of clutch may be used for this purpose but I prefer to use a clutch of the form more clearly illustrated in Figs. 5, 6 and 7. In this form of clutch I provide in the shafts 17 and 19, a plurality of notches 36 arranged to engage with pawls 37 which are pivotally secured to the respective drums 35 on the end of rollers 18 and 20. These pawls, preferably four in number, are caused by gravity to tend to drop into engagement with notches 36 as they pass over the top of shafts 17 and 19, some of said pawls always being above said shafts for any position. To withdraw the pawls 37 from the notches 36 I provide clutch members 40, applied on shafts 17 and 19 respectively and provided with pins 41 arranged to extend into drums 35 between shafts 17 and 19 and the shank portions of pawls 37, said pins being arranged to lift the pawls 37 out of engagement with notches 36 when the clutches are in their outermost position, as the upper clutch shown in Fig. 2, but said pins having thinner portions 42 wherein the shanks of said pawls 37 may rest to permit said pawls to engage within the notches 36 and lock rollers 18 and 20 to their respective shafts when the clutches 40 are in their innermost position as shown on the lower shaft 19 in Fig. 2.

Clutches 40 are engaged by bell crank arms 43 and 44 respectively that are pivoted on the brackets 45 and are connected with each other by link 46 in such a manner that when one clutch is in its innermost or engaging position the other clutch will be moved to its outermost or disengaging position.

The link 46 is arranged to be moved by a lever arm 47 disposed between two lugs or screws 48 on said link and arranged to be engaged by a suitable operating device 50 one of which is provided adjacent each end of the curtain. The lever 47 is pivoted on the frame 15 and preferably has a bell crank arm 51 that is connected with a spring 52 which is arranged to pass center as lever 47 is moved from one position to another, said spring serving to snap said lever 42 from one extreme position to another thereby insuring a quick and complete shifting of the clutches 40. The shifting of the clutches 40 is thus automatically accomplished at each end of the cycle it being understood that the curtain will be wound on one direction until the curtain is all wound upon one roller and then the clutches will be shifted and the direction of movement of the curtain reversed until it is wound back onto the other roller.

The time during which any advertisement is displayed is controlled by the stopping and starting of the motor 24. This is accomplished by breaking the wiring circuit to the motor, as in Fig. 10. The motor circuit includes circuit wires 53 and 54 connected respectively to vertically disposed contact bars 55 and 56 at the side of the curtain, said bars 55 and 56 being arranged to be engaged and bridged electrically by contactor 57 on the respective curtain so that when one of the contactors 57 is in engagement with contact bars 55 and 56 the circuits to the motor 24 will be closed.

This insures that each curtain will be moved continuously from the time the contactor 57 on one section of said curtain engages one end of bars 55 and 56 until said contactor passes off of the other end of said bars. It will be understood that the contactor of one curtain will pass off of the ends of bars 55 and 56 before the contactor of the next succeeding curtain passes onto the other end of said bars. This leaves the circuit to the motor broken and provides for a time interval of rest for the curtain in which an advertisement may be displayed. It also makes necessary the provision of other means for closing circuits to start the motor and move the next succeeding contact 57 into engagement with bars 55 and 56.

This is accomplished by a pneumatic timing and switch device embodying a cylinder 60 having a suitable piston 61 therein that is connected by rod 62 with switch lever 63 that is arranged to engage contact 64. The switch formed by lever 63 and contact 64 is connected between wires 53 and 54 in the manner shown in Fig. 10 so that it will shunt out bars 55 and 56 when closed and close the motor circuit. A screw 65 is provided at the bottom of cylinder 60 to regulate the area of the opening through which air may escape and to thereby regulate a length of time that it will take for contact lever 63 to move downwardly and engage contact 64, thus regulating the length of time that the pictures or advertisements will be displayed.

It is also necessary to provide suitable reset mechanism for the switch formed by the contact lever 63 and contact 64. To do this the contact lever 63 is pivoted at 66 and to the rear side of the machine and is connected by cable 67 with the upper end of trip member 68.

The trip member 68, as shown in Figs. 2, 4 and 9, has an arm 70 on its bottom end that extends at right angles therefrom and is arranged to be engaged and held down by a prong 71 on a lever 72 that is pivoted at 73 and connected by a cable 74 with one end of a bell crank member 75. Bell crank 75 is fulcrumed at 76 and has an upwardly projecting end provided with a roller 77 that is arranged to bear against a transverse roller 78 under which the curtain 21 passes. A tension spring 80 is arranged to exert a downward pull on lever 72 thus keeping roller 77 pressed upwardly against roller 78. When the clips 22 at the ends of sections 21 of the curtain enter between roller 78 and roller 77 they press roller 77 downwardly thus lifting the front end of lever 72 and moving prong 71 far enough to release trip member 68 whereupon a spring 59 on the top of piston 61 will begin to move the front end of lever arm 63 downward and raise the trip member 68. The piston 61 will move down slowly as the air escapes from beneath said piston and during this time the circuit through contact bars 55 and 56 will be broken so that the motor will be stopped and one section 21 of the curtain will be stopped and displayed. As the piston 61 approaches the lower limit of its movement the contact lever 63 will engage contact block 64, the shunt circuit to the motor will be closed and the motor started. As soon as the motor is started movement of the curtain will begin and the next succeeding contactor 57 on the curtain will engage bars 55 and 56 and will keep the motor energized until the next succeeding curtain section is brought completely into view whereupon the contactor 57 will break contact with bars 55 and 56 just after the clips 22 have operated the trip mechanism as just previously described.

As soon as the motor is started by closing the circuit through contacts 63 and 64 a reset mechanism for the tripping devices is set into action. Said reset mechanism comprises a pinion 81 on shaft 27 arranged to mesh with and drive a larger gear-wheel 82 which is connected with a reset bar 83 so that said reset bar will be reciprocated by rotation of said gearwheel.

The upper end of reset bar 83 passes slidably through a clip 84 on the upper end of a vertically movable reset member 85 and said reset bar has means 86 arranged to engage with the top end of reset member 85 for moving said reset member downwardly as the bar descends. The reset member 85 has clips 87 that fit over and are movable vertically on a supporting bar 88 and said reset bar is provided with an arm 90 that engages the top of a bracket 91 on the trip member 68 for moving said trip member downwardly and resetting the same, at the same time again lifting contact arm 63 into the raised position shown in Fig. 4.

The curtain sections 21 are guided over a small guide roller 79 at the top of the machine.

The sectional curtain may be made up of any desired number of sections up to the capacity of the rollers. The curtain is preferably wound upon one roller and attached to the other roller. If, when the electric current is turned on the switch formed by contacts 63, 64 is closed the motor will start thus bringing a curtain carried contactor 57 into engagement with conductor bars 55 and 56, and causing the curtain section 21 that has been in front of the sight opening 16 to be rolled onto a roll and the next succeeding curtain section to be unrolled and displayed. At the instant the curtain section that is being unrolled registers fully with sight opening 16 the splicing strips 22 at the bottom edge of said curtain section will be drawn between rollers 77 and 78 and the trip mechanism operated and as soon as this has been done the contactor 57 will move off of contact bars 55 and 56 and the circuit to the motor 24 will be broken thus stopping the curtain section in alignment with the sight opening.

The curtain will remain stationary as long as the motor circuit is broken and the motor circuit will not be closed until the contact lever 63 engages contact block 64. The time interval between the operation of the trip mechanism and the closing of the circuit by contacts 63 and 64 may be varied by adjustment of nut 65. As soon as the circuit is closed by contact 63 and 64 the motor 24 will be started and the next succeeding contactor 57 moved into engagement with the contact bars 55 and 56 thus keeping the motor circuit closed while the previously displayed curtain section is being moved out of sight and the next succeeding curtain section is being exposed to view. As soon as the motor is started the reset mechanism will be operated and the first downward movement of reset bar 83 will move reset member 85 downwardly thus moving trip member 68 downwardly into engaged relation with prong 71 and lifting contact 63 out of engagement with contact 64.

Operating in the manner above described this machine will continue to display successive sections of the curtain until the last section of said curtain is reached, whereupon a trip member 50 on the last curtain section 21 will strike the lever 47 and move said lever until it comes in contact with the lug 48 and moves it downwardly thereby operating the clutches 40 and releasing the roller 18 from its power driving means and applying the power driving means to the roller 20. When this is accomplished the curtain then begins to wind on the roller 20 through the fact that the contactor 57 on the curtain is still in engagement with the conductor bars 55 and 56 which assures that the motor is in operation and consequently the contactor 57 will travel, while in contact with the bars 55 and 56, to the upper end thereof and will ride off that end of the bars thereby breaking the circuit. The machine will continue to operate in this manner displaying a continuous change of advertisements until it is stopped.

The provision of the sectional curtains hooked together with clips 22 in the manner described constitutes an important part of the invention because it makes possible the removal or insertion of a curtain section quickly and easily and without stopping the machine for any long period of time.

The special arrangement of the clutches so that one roller is always winding the curtain thereon and the power is always disconnected from the other roller obviates any necessity for mechanism to compensate for variations in the size of the rollers under operating conditions.

The machine is neat in appearance, and compact in construction, reliable and efficient in operation and will run for long periods of time without any attention.

The foregoing description and accompanying drawings clearly disclose a preferred embodiment of my invention but it will be understood that this disclosure is merely illustrative and that such changes in the device may be made as are within the scope and spirit of the following claims.

What I claim is:

1. In an advertising device, a frame having a display opening, rollers at the top and bottom of said display opening respectively, a curtain formed of a plurality of sections and arranged to be rolled on said rollers, clips detachably connecting the ends of said sections, means for periodically moving and stopping said curtains and timing means operated by said clips for determining the time that said curtains will be at rest.

2. In an advertising device, a frame having a display opening, a roller at the top of said display opening, another roller at the bottom of said display opening, electrically operated driving means for periodically rotating and stopping said rollers, a curtain arranged to be wound on said rollers, and contact means carried by said curtain and means arranged to cooperate with said contact means for controlling the supply of current to said driving means.

3. In an advertising device, a frame having a display opening, a roller at the top of said display opening, another roller at the bottom of said display opening, electrically operated driving means for periodically rotating and stopping said rollers, a curtain arranged to be wound on said rollers, contact means carried by said curtain and means arranged to cooperate with said contact means for breaking the circuit to said electrically operated driving means and time controlled devices for closing said circuit.

4. In an advertising device, a frame having a display opening, a roller at the top of said display opening, another roller at the bottom of said display opening, electrically operated driving means for periodically rotating and stopping said rollers, a curtain arranged to be wound on said rollers, contact means carried by said curtain and means arranged to cooperate with said contact means for breaking the circuit to said electrically operated driving means, timing devices controlling the closing of said circuit and means on said curtain for starting the operation of said timing devices after said circuit is broken.

5. In an advertising device, a frame having a display opening, a roller at the top of said display opening, another roller at the bottom of said display opening, electrically operated driving means for periodically rotating and stopping said rollers, a curtain formed of a plurality of sections arranged to be wound on said rollers, clip means connecting the ends of said sections, contact means carried by said curtain and means arranged to cooperate with said contact means for breaking the circuit to said electrically operated driving means when a section of said curtain registers with said display opening, timing devices controlling the closing of said circuit after it is broken, and means operated by said readily detachable clip means for starting the operation of said timing device.

6. In an advertising device, a frame having a display opening, a roller at the top of said display opening, another roller at the bottom of said display opening, electrically operated driving means for periodically rotating and stopping said rollers, a curtain arranged to be wound on said rollers, contact means carried by said curtain and means arranged to cooperate with said contact means for breaking the circuit to said electrically operated driving means, timing devices controlling the closing of said circuit, means on said curtain for starting the operation of said timing device after said circuit is broken, and reset means for said timing devices.

7. In an advertising device, a frame having a display opening, a roller at the top of said display opening, another roller at the bottom of said display opening, electrically operated driving means, for periodically rotating and stopping said rollers, a curtain arranged to be wound on said rollers, two parallel contact bars at the side of said curtain forming a part of the circuit to said electrically operated driving means, means on said curtain at intervals greater than the lengths of said bars for bridging said contact bars and timing devices for closing the circuit after it is broken by said bar bridging means.

8. In an advertising device, a frame having a display opening, a roller at the top of said display opening, another roller at the bottom of said display opening, electrically operated driving means for periodically rotating and stopping said rollers, a curtain arranged to be wound on said rollers, two parallel contact bars at the side of said curtain forming a part of the circuit to said electrically operated driving means, means on said curtains at intervals greater than the lengths of said bars for bridging said contact bars, timing devices for closing the circuit after it is broken by said bar bridging means, means on said curtains for starting the operation of said timing devices and reset means for said timing devices.

9. In an automatic advertising display device, a frame, a sight opening in the front of said frame, two shafts extending crosswise of said frame above and below said sight opening, rollers rotatably mounted on said shafts, a clutch for connecting each of said rollers to its respective shaft, means interconnecting said clutches for disengaging one clutch when the other clutch is engaged, electrical means for driving said shaft, a sectional curtain arranged to be wound on said rollers, means on each end section of said curtain for reversing said clutches, electrical circuits connected with said driving means, contact means on said curtains and means arranged to cooperate with said contact means for breaking said electrical circuits, timing devices for closing said circuits after they are broken and means for automatically resetting said timing devices.

10. In an automatic advertising display device, a frame, a sight opening in the front of said frame, two shafts extending crosswise of said frame above and below said sight opening, rollers rotatably mounted on said shafts, a clutch for connecting each of said rollers to its respective shaft, means interconnecting said clutches for disengaging one clutch when the other clutch is engaged, electrical means for driving said shafts, a sectional curtain arranged to be wound on said rollers, means on each end section of said curtain for reversing said clutches, electrical circuits connected with said driving means, two spaced apart contact bars arranged at the side of said curtain and forming a part of said electrical circuits, a contactor on each curtain section arranged to electrically connect said bars and to break said circuit when it passes off of the ends of said bars, timing devices including a switch shunted into said circuit for closing said circuits in a predetermined length of time after they are opened, trip means for starting the operation of said timing device, means at the ends of said curtain sections for releasing said trip means and automatic means for resetting said timing devices and said trip means.

In witness whereof, I hereunto subscribe my name this 25th day of March, A. D. 1925.

FRANK W. BLUMIE.